Jan. 22, 1957 H. W. EVANS 2,778,625
PIPE CUTTING MACHINE OF THE PANTOGRAPH TYPE
Filed July 15, 1955 2 Sheets-Sheet 1
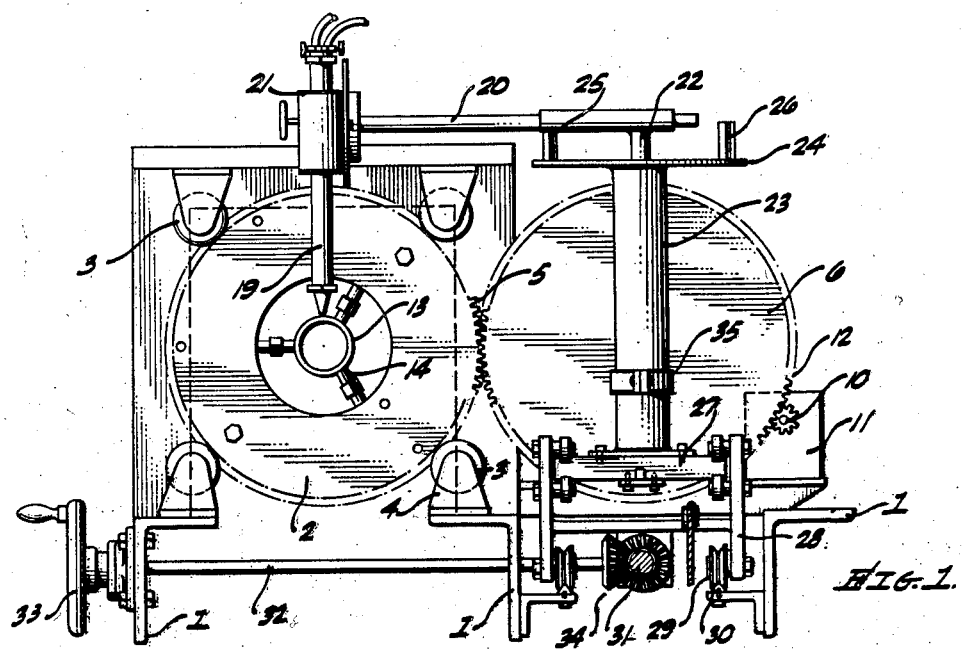
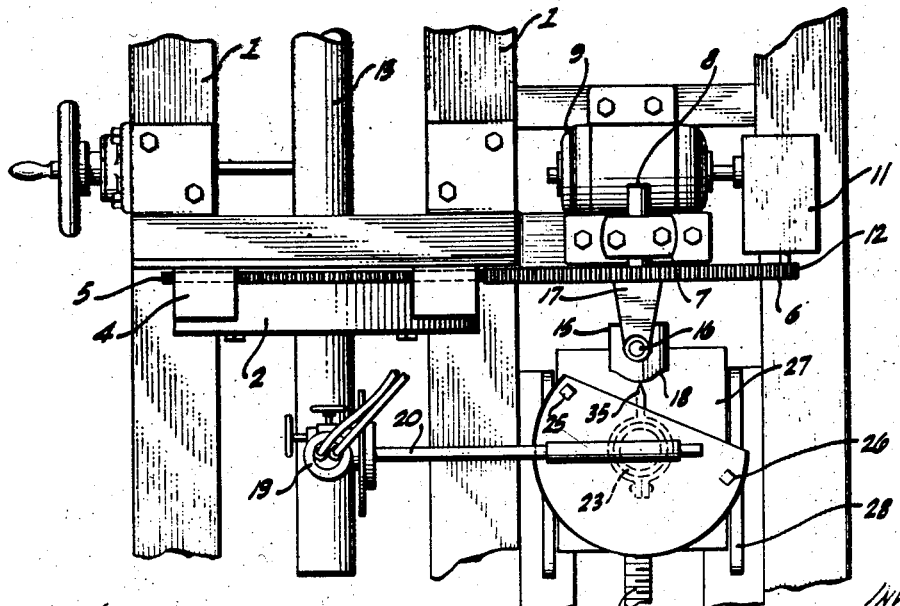
INVENTOR.
HARRY WILLIS EVANS,
BY
ATTORNEY.

Jan. 22, 1957   H. W. EVANS   2,778,625
PIPE CUTTING MACHINE OF THE PANTOGRAPH TYPE
Filed July 15, 1955   2 Sheets-Sheet 2

INVENTOR.
HARRY WILLIS EVANS,
BY
ATTORNEY.

United States Patent Office 2,778,625
Patented Jan. 22, 1957

2,778,625

PIPE CUTTING MACHINE OF THE PANTOGRAPH TYPE

Harry Willis Evans, Anaheim, Calif.

Application July 15, 1955, Serial No. 522,297

4 Claims. (Cl. 266—23)

This invention relates to a pipe cutting machine of the pantograph type, in which a cutting torch is guided by means of a cam or cam surface to cut a particular pattern or surface on a rotating pipe. This invention is also an improvement on my Patent No. 2,698,748, issued January 4, 1955.

An object of my invention is to provide a novel pipe cutting machine in which a pipe can be mounted in a rotating chuck and thus turned under a cutting torch, the torch being moved relative to the pipe by means of a rotating cam or cam surface which is turned synchronously with the pipe.

Another object of my invention is to provide a novel pipe cutting machine of the character stated, in which the cam can either be changed or its angle in the machine can be altered to vary the type of cut which is being made on the pipe.

Still another object of my invention is to provide a novel pipe cutting machine of the character stated which is simple in construction, is relatively inexpensive to manufacture, and which is applicable to type of cuts which are made on a pipe, such as different angles of a pipe, different sizes of pipe, etc.

Other objects, advantages and features of invention may appear from the accompanying drawing, the subjoined detailed discription and the appended claims.

In the drawing—

Figure 1 is an end view of my pipe cutting machine.

Figure 2 is a top plan view of the same.

Figure 3:
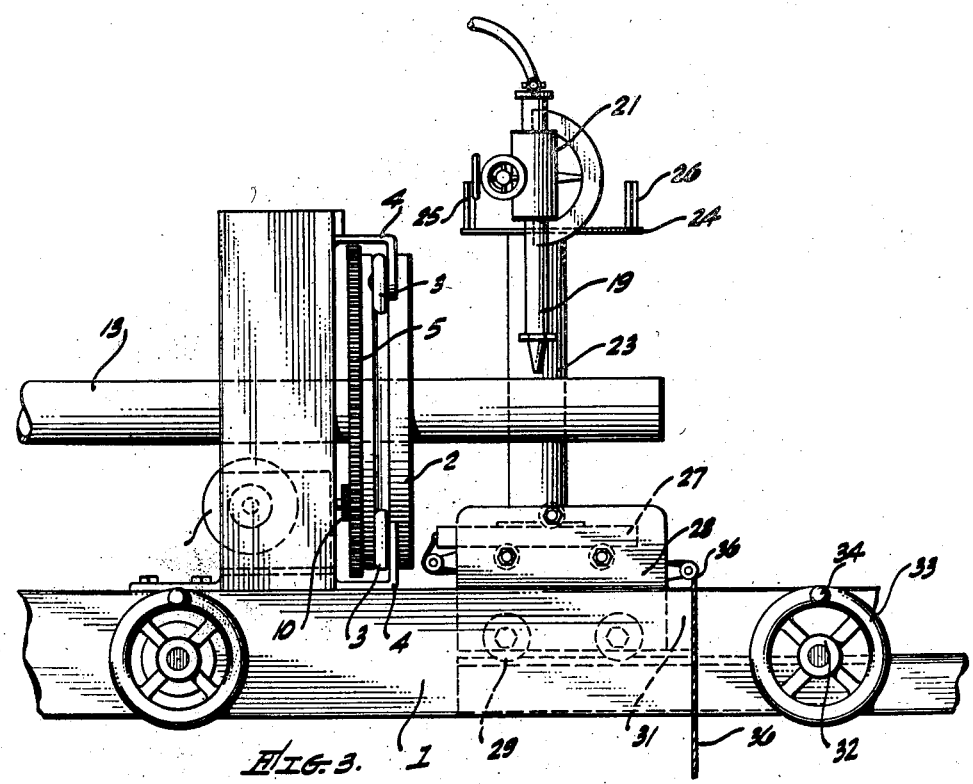
Figure 3 is a side elevation of the same.
Figures 4, 5:
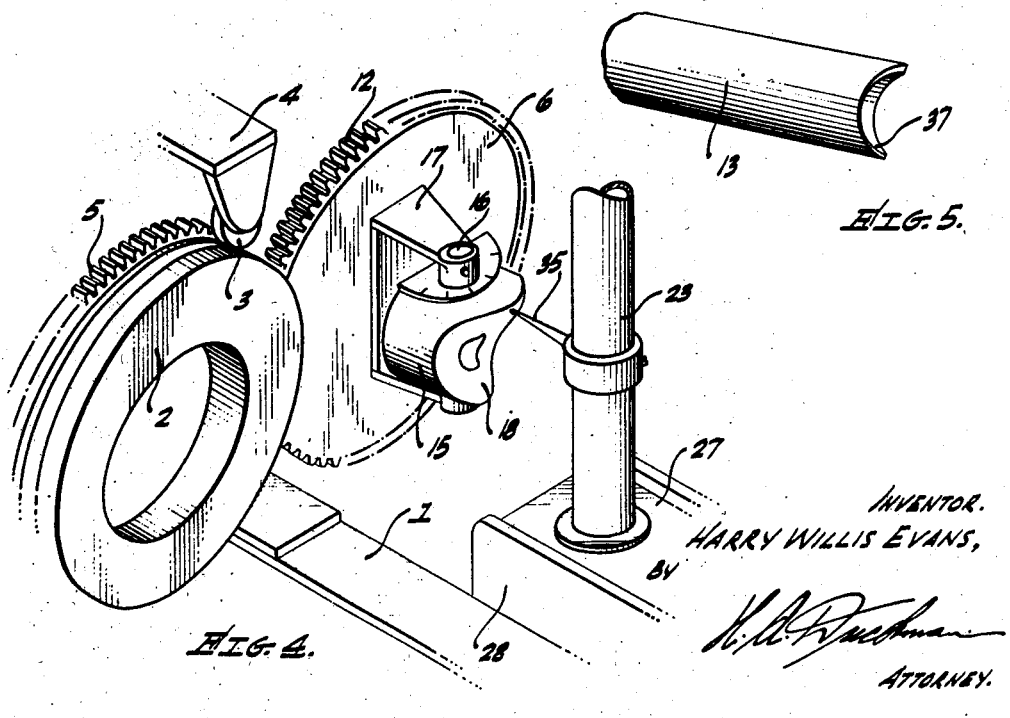
Figure 4 is a fragmentary perspective view showing particularly the cam surface.
Figure 5 is a fragmentary perspective view of a pipe after it has been cut.

Referring more particularly to the drawing, the numeral 1 indicates a frame or bed consisting of suitable structural members as required to support the machine. A chuck 2, annular in form, is mounted on the frame 1 by means of a plurality of rollers 3 which engage the periphery of the chuck. The rollers 3 are suitably mounted on the frame 1 on brackets 4 which are fixedly attached to the frame, substantially as shown. The chuck 2 is provided with a ring gear 5 on the periphery thereof, and this ring gear is either cut directly on the chuck or it may consist of a band fixedly attached to the chuck. A disc 6 is journaled on the frame 1 in the bearing 7 into which the trunnion 8 extends. The trunnion 8 projects from the rear face of the disc 6, substantially as shown in Figure 2. The disc 6 is thus positioned at one side of the chuck 2 and the centers of these members are substantially in horizontal alignment. The disc 6 is continuously rotated by the motor 9 which drives the pinion 10 through a reduction gear box 11. The pinion 10 engages the external gear 12 on the disc 6. The gear 12 in turn meshing with the gear 5 so that rotation of the disc 6 will simultaneously and synchronously rotate the chuck 2. The pipe 13, which is to be cut, is held in the chuck 2 by suitable jaws or by means of the threaded pins 14 which extend radially through the chuck to engage the pipe. The pipe 13 is thus concentrically held in the chuck and is rotated with the chuck, and synchronously with the disc 6. A cam 15 is mounted on the front face of the disc 6 in the following manner:

A vertical shaft or trunnion 16 extends vertically with relation to the cam 15. This shaft or the trunnions are journaled in a bracket 17 affixed to the front face of the disc 6. The cam 15 can thus be rotated around a vertical axis, thereby changing the angle of its cam face to a stylus, as will be subsequently described. The cam face 18 of the cam 15 may be either concave or convex, and it may also be either symmetrical or unsymmetrical with relation to a vertical plane. In other words, the shape of the cam face 18 can be varied to suit the particular cutting requirements. By changing the angle of the cam 15 around its vertical axis, it is possible to cut the pipe 13 so that various angles of the assembled pipe are possible; in other words, it is not necessary that the pipes be positioned 90° to each other but, on the contrary, can be cut so as to fit at any angle. A cutting torch 19, of usual and well known construction, is mounted on a horizontal rod 20, the rod being provided with a clamp 21 at its outer end which encircles and grips the torch 19. The rod 20 is, in turn, affixed to the upper end of a post 22 which is journaled in the sleeve 23. A plate 24 mounted on the upper end of the sleeve 23 is provided with upwardly projecting stop lugs 25—26, which are engaged by the rod 20 to limit the swinging movement of this rod, and also to permit the rod 20 with the torch 19 to be swung away from its working position over the pipe 13. The sleeve 23 is fixedly mounted on the upper face of a plate 27, and this plate is slidably mounted for horizontal movement between the side walls of the carriage 28. The carriage 28 has journaled thereon a plurality of rollers 29 which ride on rails 30 mounted on the frame 1. The carriage 28 may be adjusted horizontally relative to the front face of the disc 6 by means of a worm shaft 31, which is suitably journaled on the frame 1, and is threaded into the carriage 28. The shaft 31 is rotated by means of the hand shaft 32 which is journaled in the frame 1 and is rotated by the hand wheel 33. Miter gears 34 on the shafts 31 and 32 permit these shafts to be simultaneously rotated, thus enabling the carriage 28 to be adjusted relative to the front face of the disc 6, as might be desired.

A stylus 35 on the sleeve 23 engages the cam surface 18 and follows this surface as the cam 15 rotates with the disc 6. This causes the plate 27 to move horizontally in the carriage 28, thereby moving the cutting torch 19 in accordance with the shape of the cam surface 18. The plate 27 is pressed towards the disc 6, thus pressing the stylus 35 against the cam surface 18 by means of either a weight or spring, for example, a weight attached to the cord 36 which is secured to the one end of the plate 27.

In operation, the pipe 23, which is to be cut, is first mounted in the chuck 2. The cam 15 is then adjusted on its disc 6 to comply with the required angle or shape which is to be cut on the pipe. The carriage 28 is now moved towards the disc 6 until the stylus 35 engages the cam surface 18. The motor 9 is now started and the torch 19 is lighted to start burning through the pipe 13. As the disc 6 slowly rotates, carrying with it the cam 15, the stylus 35 will follow the cam surface 18, moving the sleeve 23 together with the rods 20 and 22, thus moving the cutting torch 19 relative to the pipe 13 causing the pipe 13 to be cut in conformance with the shape of the cam 18, as shown at 37.

Having described my invention, I claim:

1. A pipe cutting machine comprising a frame, a chuck journaled on the frame, a disc journaled on the frame and arranged in alignment with the chuck, drive means extending to the disc, an external gear on the disc, an external gear on the chuck meshing with the gear on the disc whereby the disc and chuck are simultaneously rotated, pipe engaging means on the chuck to engage and hold the pipe, a cutting torch, a carriage, means mounting the carriage on said frame, a plate, means mounting the plate on the carriage for horizontal movement thereon, a sleeve rising from said plate, means extending from said sleeve supporting the cutting torch, a cam, means mounting the cam on said disc, a stylus on said sleeve engaging the cam, and means urging the plate towards the cam to press the stylus against the cam.

2. A pipe cutting machine comprising a frame, a chuck journaled on the frame, a disc journaled on the frame and arranged in alignment with the chuck, drive means extending to the disc, an external gear on the disc, an external gear on the chuck meshing with the gear on the disc whereby the disc and chuck are simultaneously rotated, pipe engaging means on the chuck to engage and hold the pipe, a cutting torch, a carriage, means mounting the carriage on said frame, a plate, means mounting the plate on the carriage for horizontal movement thereon, a sleeve rising from said plate, means extending from said sleeve supporting the cutting torch, a cam, means pivotally mounting the cam on a vertical face of the disc, a stylus on the sleeve, said stylus engaging the cam, and means urging the plate towards the cam to press the stylus against the cam face.

3. A pipe cutting machine comprising a frame, a chuck journaled on the frame, a disc journaled on the frame and arranged in alignment with the chuck, drive means extending to the disc, an external gear on the disc, an external gear on the chuck meshing with the gear on the disc whereby the disc and chuck are simultaneously rotated, a pipe engaging means on the chuck to engage and hold the pipe, a cutting torch, a carriage, means mounting the carriage on the frame for horizontal movement on the frame, manual means to adjust the carriage horizontally on the frame, a plate, means mounting the plate on the carriage for horizontal movement thereon, a sleeve rising from the plate, mounting means on the sleeve to support the torch in a vertical position and adjacent the pipe, a cam, means pivotally mounting the cam on the disc, a stylus on the sleeve, said stylus engaging the cam, and means urging the plate towards the cam to press the stylus against the cam.

4. A pipe cutting machine comprising a frame, a chuck journaled on the frame, a disc journaled on the frame and arranged in alignment with the chuck, drive means extending to the disc, an external gear on the disc, an external gear on the chuck meshing with the gear on the disc whereby the disc and chuck are simultaneously rotated, pipe engaging means on the chuck to engage and hold the pipe, a cutting torch, a carriage, means mounting the carriage on the frame for horizontal movement on the frame, manual means to adjust the carriage horizontally on the frame, a plate, means mounting the plate on the carriage for horizontal movement thereon, a sleeve rising from the plate, mounting means on the sleeve to support the torch in a vertical position and adjacent the pipe, a rod extending horizontally from said sleeve, said rod supporting the torch in a vertical position and adjacent the pipe, a cam, means pivotally mounting the cam on a vertical face of the disc, a stylus on the sleeve, said stylus engaging the cam, and means urging the plate towards the cam to press the stylus against the cam.

References Cited in the file of this patent
UNITED STATES PATENTS 2,389,286     Watkins _____ Nov. 20, 1945

FOREIGN PATENTS 582,869     Great Britain _____ Nov. 29, 1946